April 16, 1946.  A. A. GASSNER  2,398,704
ENGINE NACELLE INSTALLATION FOR AIRCRAFT
Filed May 3, 1943  4 Sheets-Sheet 1
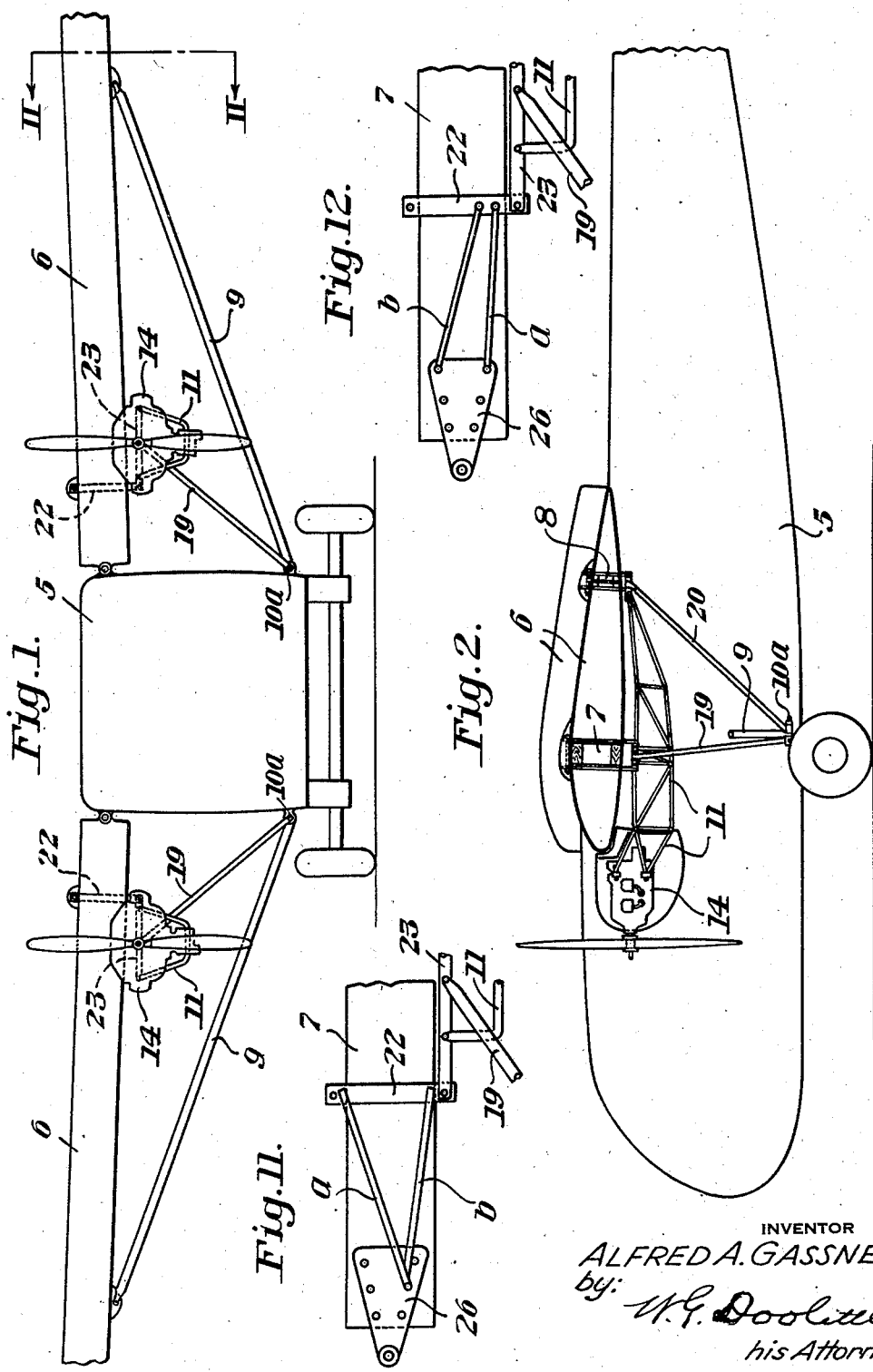
INVENTOR
ALFRED A. GASSNER,
by: W. G. Doolittle
his Attorney.

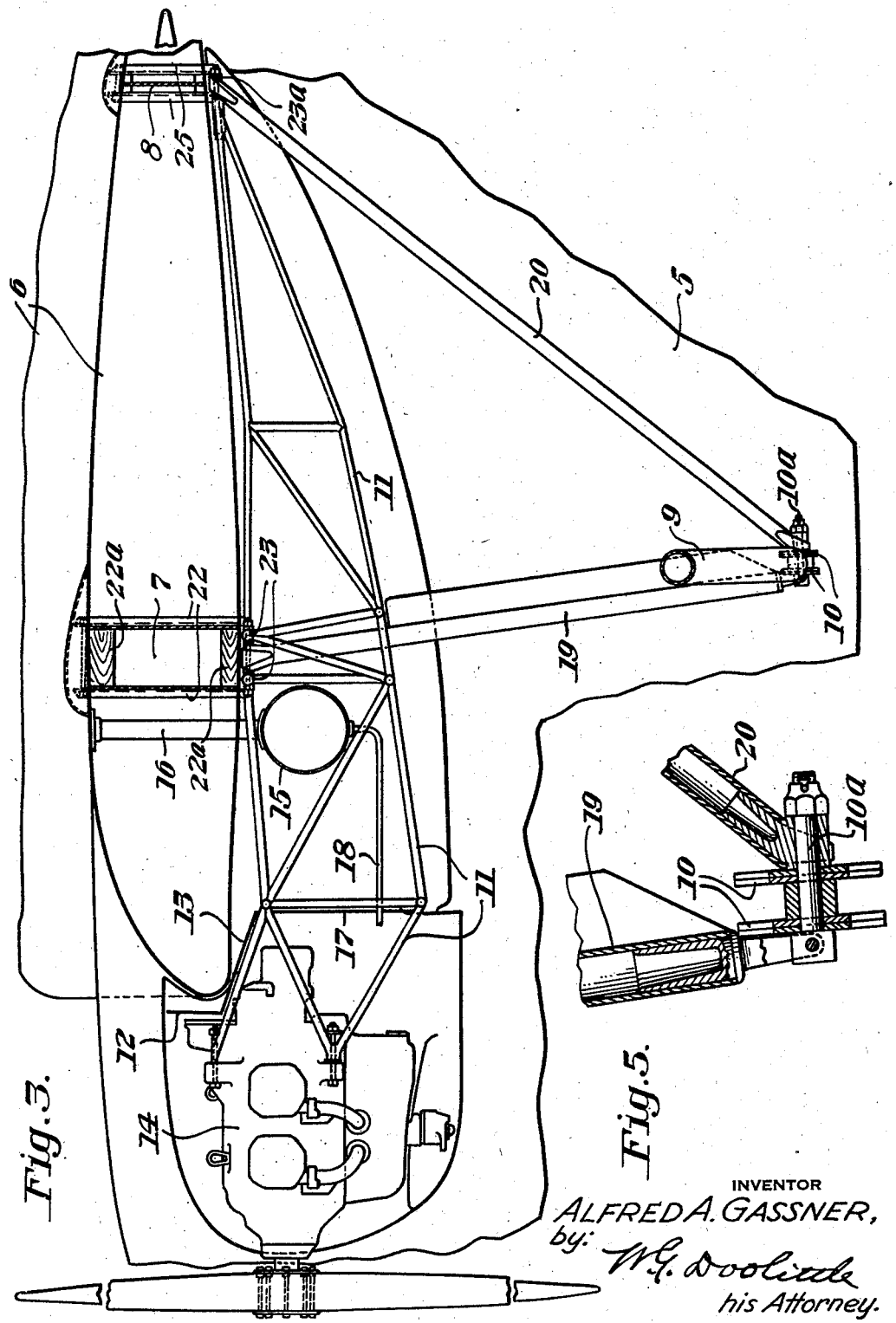

April 16, 1946.　　　A. A. GASSNER　　　2,398,704
ENGINE NACELLE INSTALLATION FOR AIRCRAFT
Filed May 3, 1943　　　4 Sheets-Sheet 3
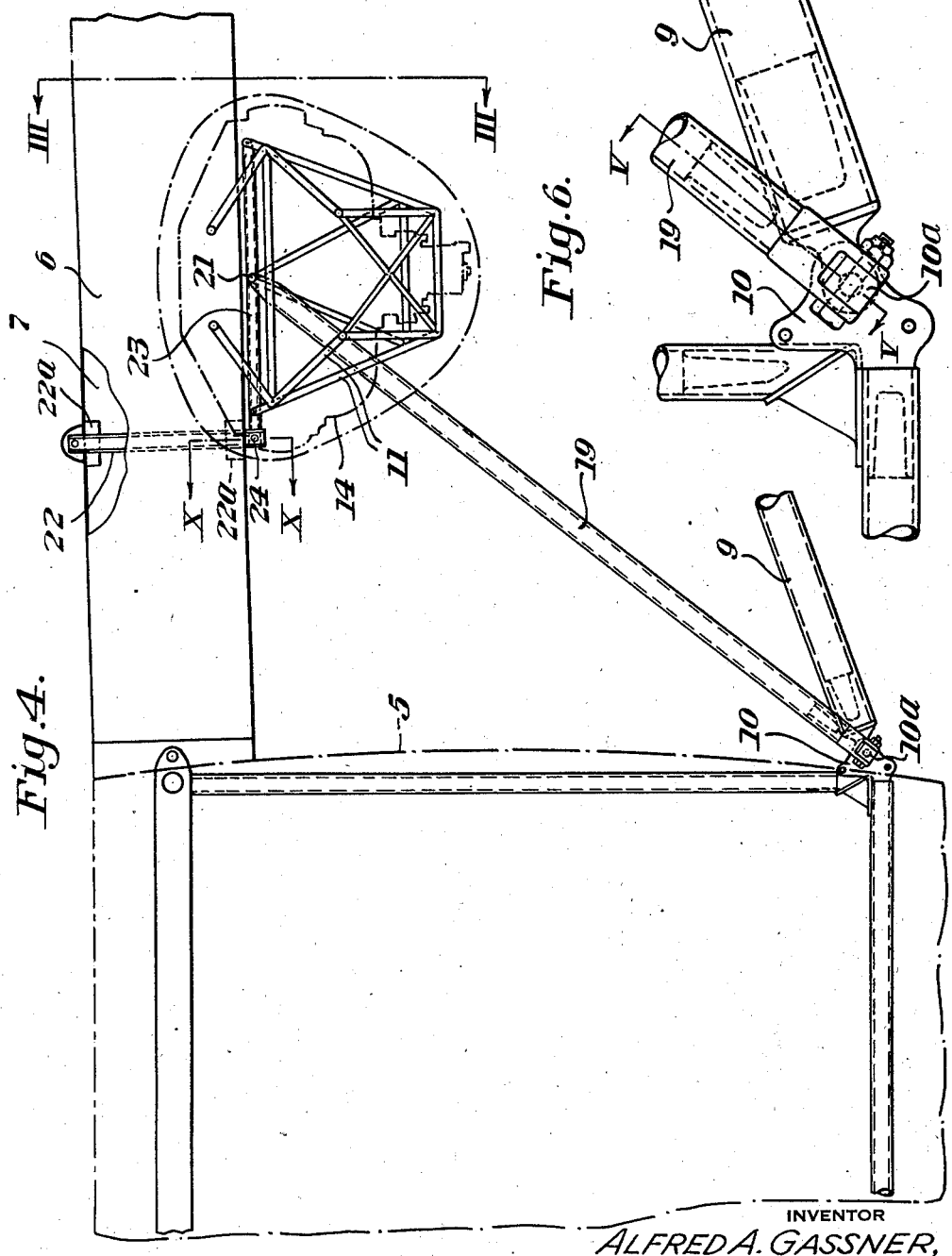
INVENTOR
ALFRED A. GASSNER,
by: W. G. Doolittle
his Attorney.

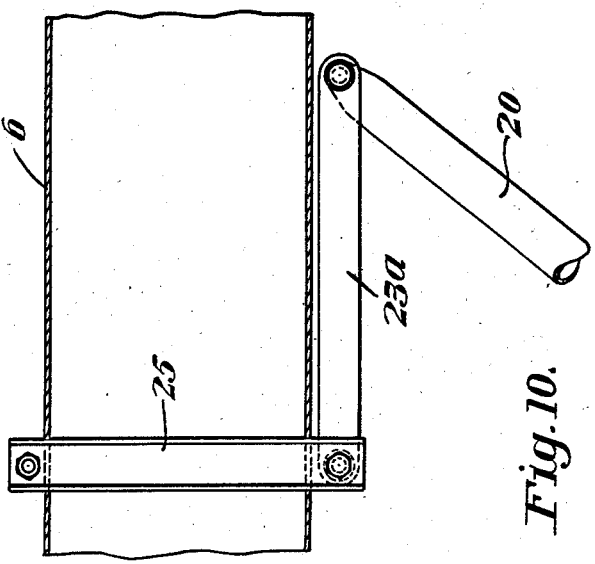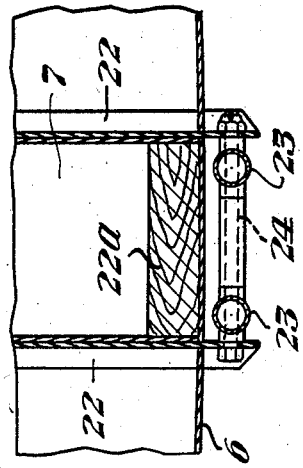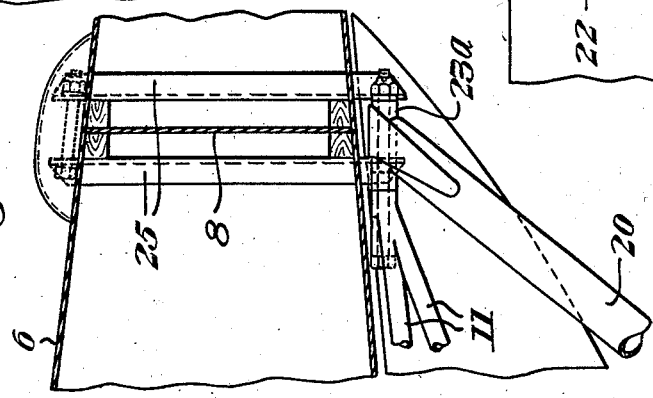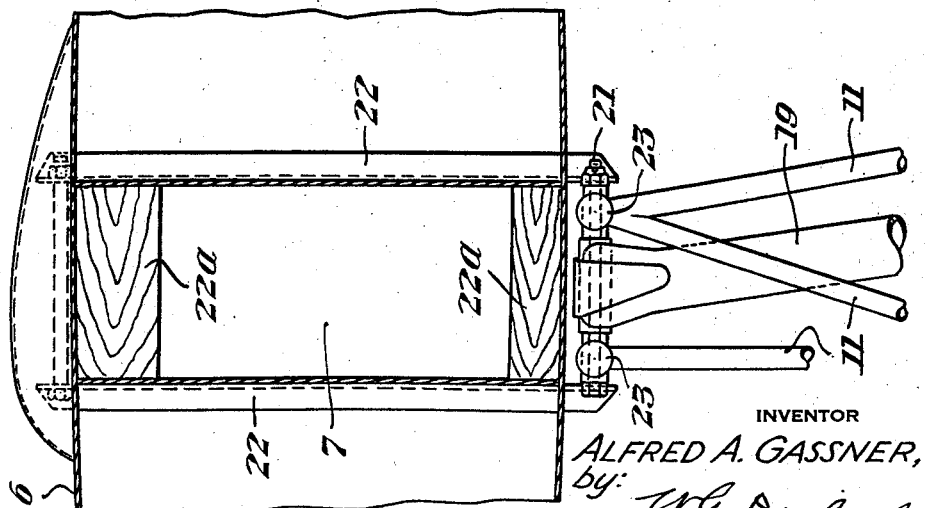

Patented Apr. 16, 1946

2,398,704

UNITED STATES PATENT OFFICE 2,398,704

ENGINE NACELLE INSTALLATION FOR AIRCRAFT

Alfred A. Gassner, New York, N. Y., assignor, by mesne assignments, to Ridgefield Manufacturing Corporation, Ridgefield, N. J., a corporation of New Jersey Application May 3, 1943, Serial No. 485,425

7 Claims. (Cl. 244—54)

This invention relates to improvements in aircraft and more particularly to engine nacelle installations for aircrafts of the large transport glider type embodying a large fuselage provided with elevators, rudder, etc., and large wing spreads.

The wing structure of such gliders is not sufficiently strong to take the weight of an engine nacelle or nacelles in addition to the normal flight loads, therefore they cannot be solely and directly supported by the wing structure. It is desirable, however, to position the nacelle or nacelles at predetermined points along the forward part of the aircraft wing. This must be accomplished in such a manner that the weight or weight reactions do not cause additional detrimental stresses in the wing structure.

An object of the present invention is to provide efficient and simple means embodying struts and a combination and arrangement of parts designed to cooperate with the glider structure, whereby the weight or weight reactions of the engine nacelle are carried to the fuselage, not causing additional deterimental stresses in the basic wing structure, and may even serve to increase the strength of the original wing structure.

The present invention also contemplates a nacelle installation in which the wing structure of the glider or aircraft takes only spanwise side load components of the support struts of the nacelle installation, which spanwise side load can usually be made, in effect, a relieve load on the wing structure.

A further object of the present invention is, to provide a nacelle installation embodying nacelle struts in which the struts may be attached to fittings employed in wing lift struts and landing gear attachments of a glider or aircraft structure, and when thus located, it will be understood that the horizontal components of the load in the said nacelle struts are taken by the wing spars, these components are tension-pulling outboards at the front spar, and compression-acting inboards at the rear spar. It is further contemplated that the front spar of the wing structure takes the torque loads of the engines as vertical loads.

In the accompanying drawings which illustrate an application of my invention:

Fig. 1 is a diagrammatic front view of an aircraft embodying my invention;

Fig. 2, a diagrammatic side view taken on line II—II of Fig. 1;

Fig. 3, a view similar to Fig. 2, showing the parts enlarged, the view being taken on line III—III of Fig. 4;

Fig. 4, a diagrammatic front view particularly showing one nacelle installation on enlarged scale;

Fig. 5, a detail sectional view taken on line V—V of Fig. 6;

Fig. 6, a detail view particularly showing connection of engine nacelle strut with fuselage;

Fig. 7, an enlarged detail view partly in section showing the front spar of the wing structure and connections leading thereto;

Fig. 8, a view similar to Fig. 7, showing the rear spar of the wing structure and attaching means for wing and nacelle struts;

Fig. 9, an enlarged detail particularly showing a nacelle strut and connection therefor with a wing spar, a bolt supported from the wing structure by a straddle member;

Fig. 10, a detail sectional view taken on line X—X of Fig. 4; and

Figs. 11 and 12, detail diagrammatic views particularly showing two forms of connection between the straddle fitting at the wing front spar and a wing root fitting.

In the illustrated embodiment of my invention I have shown a transport glider or aircraft including a fuselage 5, which is provided with the conventional elevator, rudder, etc., not shown, and a divided wing structure 6, of relatively large wing spread located at the top of the fuselage and attached thereto adjacent its top by any suitable means. This wing structure includes a front spar 7 and a rear spar 8, and 9 designates wing lift struts extending upwardly from a fitting 10 on the fuselage.

The structure entering into nacelle installation of my invention includes an engine nacelle designated generally by 11, preferably constructed of welded metallic tubing, an engine cowling 12 preferably formed with cooling baffles and made of aluminum, and a nacelle cowling 13, made of metal or of plywood. This installation also includes suitable engines 14, a fuel tank 15 for each set of engines, fillable through a flexible metal hose 16 extending through the wing to the top wing skin. 17 designates a fire wall that separates the engines from the wing and also from the fuel tank.

It will of course be understood that the fuel lines 18 from tank to the engines are provided with valves that may be operated from the cockpit of the glider or aircraft and that engine throttle and magneto control, not shown, may likewise be operated by suitable means from the cockpit of the glider.

Characteristic and important features of my invention reside in the employment of and in the arrangement of engine nacelle struts positioned between the fuselage and the wing structure, whereby the weight or weight inertia reactions of the engines are carried to the fuselage and do not cause additional detrimental stresses on the wing structure.

As illustrated and as preferred I employ front struts 19 extending from the fuselage to a point of nacelle below the front spar 7 of the wing structure and rear struts 20 extending from the fuselage to a point of nacelle below the rear spar 8 of the wing.

The front nacelle lift strut 19, preferably a steel tube with fabric fairing, is attached at its lower end to the fitting 10 by a bolt 10a and extends upwardly to and is connected with the engine nacelle frame by a swivel joint and a single bolt 21, whereby the nacelle is free to swivel laterally about this bolt. 22 designates a straddle fitting clamped to the wing front spar 7, this fitting is braced sideways-spanwise by blocks 22a glued or otherwise connected to the spar webs. This nacelle structure is attached to the fitting 22 by a link connection 23, the latter having swivel connections with the nacelle through a bolt 24 and the said strap fitting 22 of the wing and will transmit thrust loads, torque loads and strut outboards-wise reaction to the wing spar. No vertical weight reactions however, are taken by the said spar.

The rear strut 20 extends from the fuselage and is connected to a strap fitting 25 on the rear spar of the wing through a link connection 23a, this fitting 25 takes the inboard-wise rear nacelle strut reaction.

In Fig. 11 there is shown, mainly diagrammatically, engine nacelle connected to the wing front spar strap fitting 22 and in which brace members a and b are employed connecting with the fitting and with a hinge or root fitting 26 of the wing. The braces a and b forming thrust and tension members between the fittings, whereby outward-wise reaction of the engine nacelle is transmitted through the brace connections in such manner as to cause an up or down load at the strap fitting 22—the thrust or load as created through reaction of the engine nacelle being transmitted to the root fitting, relieving the wing of loads imposed by engine reaction.

Similarly as in Fig. 12, the braces a and b act through their connections with the strap 22 and hinge or root fitting 26 to transmit or transfer engine reaction load or thrust to cause a downwardly directed load at the strap fitting, which is a relieve load for a particular wing structure or cantilever wing.

What I claim is:

1. In combination with craft of the class described having a fuselage and a wing extending laterally therefrom, an engine nacelle connected to said wing, strut means extending from the fuselage to said nacelle, a connection from the nacelle to the wing located between the fuselage and the zone of connection of the strut means to said nacelle, the connections of the strut means to the fuselage and nacelle and of the nacelle to said wing being on pivotal axes approximately parallel to the plane of longitudinal symmetry of the craft.

2. In combination with craft of the class described having a fuselage member and a wing member extending therefrom, an engine nacelle, an engine carried by the nacelle, means pivotally mounting the nacelle to said wing member, for swinging movement about an axis located laterally spaced to one side of the longitudinal axis of the nacelle, and strut means extending from the other member and connected in spaced relation to the pivotal axis of said first means supporting the weight of the nacelle and engine and normally relatively fixedly holding the nacelle against said swinging movement.

3. In combination with craft of the class described having a fuselage and a wing extending laterally therefrom, an engine nacelle disposed relatively close to said wing in outwardly spaced relation to the fuselage, means pivotally connecting the nacelle to said wing on an axis approximately parallel to the longitudinal center line of the fuselage, and strut means pivoted adjacent to the wing approximately centrally of and to the nacelle on an axis parallel to said axes and outwardly of the pivotal connection of the nacelle to the wing and connecting it to the fuselage.

4. In combination with craft of the class described having a fuselage and a wing extending therefrom, an engine nacelle, an engine carried by the nacelle, means pivotally mounting the nacelle for swinging movement thereof to said wing for swinging movement about an axis located laterally spaced to one side of the longitudinal axis of the nacelle, and strut means extending from the fuselage and connected to the nacelle in spaced relation to the pivotal axis of the nacelle, supporting the weight of the nacelle and engine and normally relatively fixedly holding the nacelle against swinging movement.

5. In aircraft having a fuselage and a wing structure including a front spar and a rear supporting element, an engine nacelle installation therefor having propulsion means, said installation including a nacelle having pivotal connections to the said front spar and rear supporting element on an axis approximately parallel to the fuselage, a front nacelle-supporting strut extending from the fuselage, means pivotally connecting the strut to the nacelle on an axis parallel to said axis of the nacelle, and a rear nacelle-supporting strut extending from the fuselage pivotally connected on approximately the latter axis to the nacelle, the first-mentioned pivotal connections being located between the second-mentioned axis and the fuselage, whereby the horizontal components of the load in the nacelle-supporting struts are taken by the front spar and rear supporting element, the components acting on the front spar and rear supporting element being respectively tension-pulling outboards and compression-acting inboards.

6. In aircraft having a wing structure and a fuselage, a propelling engine, a nacelle therefor, said wing structure including a front supporting element and a rear supporting element, a fitting on the fuselage below the wing structure, a nacelle-supporting strut extending from the fitting to a point on the nacelle below the front supporting element, a second nacelle-supporting strut diverging from said first strut and connecting said fitting to a point on the engine nacelle below the rear supporting element, means for pivotally connecting the struts to the nacelle at said points, and means pivotally mounting the nacelle on the wing supporting elements at points on an axis located between he fuselage and the points of connection of said struts to the nacelel.

7. In craft of the class described having a wing structure and a fuselage and a wing root fitting at their juncture, an engine, a nacelle therefor in the form of a generally elongated truss framework engine mounting having its longitudinal axis transverse with respect to the wing, said wing having a nacelle supporting means spaced outwardly from said fitting, brace means supplemental to the wing spar connecting said first means and fitting, a second fitting on the fuselage, a nacelle-supporting strut connected between said nacelle and said second fitting, and means for pivotally connecting the engine nacelle to the nacelle supporting means.

ALFRED A. GASSNER.